United States Patent Office 3,194,779
Patented July 13, 1965

3,194,779
PREPARATION OF N-ARYL IMIDES AND AMIDES
Eric Royle Lynch, Chirk, and Ernest Bryson McCall, Llangollen, Wales, assignors to Monsanto Chemicals Limited, London, England, a British company
No Drawing. Filed Nov. 21, 1962, Ser. No. 239,363
Claims priority, application Great Britain, Nov. 29, 1961, 42,678/61
5 Claims. (Cl. 260—326)

This invention relates to a new process for the production of an aromatic compound containing an amido or imido group. The process is an improvement in or modification of the invention of copending application Serial No. 150,168, filed November 6, 1961.

The process provides a more direct synthetic route to many aromatic nitrogen-containing compounds, which are useful per se or as intermediates in the production of, for example, antioxidants, preservatives, dyestuffs and resins, than routes available hitherto.

The process of the invention is one for the introduction of an amido or an imido radical into an aromatic compound, in which the compound is heated with an N-halosulfonylamide or an N-halosulfonylimide.

The process is normally such that the nitrogen atom of the amido or imido radical becomes linked to a nuclear carbon atom of the aromatic compound.

The halosulfonyl group of the N-halosulfonylamide or N-halosulfonylimide can be, for example, a fluorosulfonyl, chlorosulfonyl or bromosulfonyl group; of these, a chlorosulfonyl group is most often preferred.

The process is generally carried out at an elevated temperature, for example a temperature higher than 125° C., and preferably above 150° C. Good results are obtained using a reaction temperature in the range of 200° C. to 300° C., for instance between 220° C. and 275° C. In practice, the requirement as to reaction temperature means that the process is particularly convenient for the introduction of an amido or imido group into an aromatic compound that is relatively high boiling, for example, diphenyl or diphenyl ether. In the instance of a more volatile compound, a high reaction temperature can be obtained by carrying out the process under a suitably elevated pressure.

The reaction proceeds satisfactorily at the appropriate elevated temperature, but its efficiency can often be improved by the presence of a catalyst. A suitable catalyst can be, for example, one of those disclosed in copending application Serial No. 226,433, filed September 26, 1962, such as a metal or metal compound.

Aromatic compounds than can function as acceptors of an amido or imido radical in the process of the invention include those where the aromatic system is carbocyclic, for instance benzene and condensed benzenoid systems such as naphthalene, and compounds containing for example, a phenyl or naphthyl group; and those where the aromatic group is heterocyclic, for instance furan, thiophene, and compounds containing, for example, a furyl or thienyl group. Heterocyclic compounds having a nitrogen atom as a member of an aromatic ring can be used, but where these are bases such as pyridine or quinoline, unwanted side reactions are likely to occur, and the process is therefore less useful in respect of such aromatic bases. More than one type of ring can be present in the aromatic ring, for instance it can be benzothiophene or dibenzothiophene, and where a compound contains, for instance, two rings, the introduction of the amido or imido radical can occur in either of them.

In general, the aromatic compound can contain other groups or atoms in addition to the aromatic system, as substituents in an aromatic nucleus or otherwise. The aromatic compound can contain, for example, an aliphatic group, for instance an alkyl group, such as a methyl, ethyl, butyl or octyl, an alkenyl group such as vinyl or allyl, a cycloalkyl group such as cyclohexyl, an aralkyl group such as benzyl, or an alkoxy group such as methoxy or ethoxy; a halogen atom, for example chlorine or bromine; an amino group; or a carboxylic ester group, for example an ethoxycarbonyl group.

Further specific examples of aromatic compounds, including substituted ones, are toluene, the xylenes, ethylbenzene, cumene, cymene, dodecylbenzene, styrene, stilbenzene, 4-isopropyldiphenyl, 1-methylnaphthalene, indene, anthracene, bromobenzene, p-chlorotoluene, o-dichlorobenzene, 2-chloronaphthalene, 4-chlorodiphenyl, anisole, phenetole, ethyl benzoate, phenyl acetate, tetraphenyl orthosilicate, diphenyl ether, diphenylamine, 2-phenylthiophene, 4-phenylbenzofuran, dibenzofuran, 1-cyclohexyldibenzofuran, 1-phenyldibenzofuran, and the like.

Within the broad class of aromatic compounds which can be employed as starting materials in the process of this invention, it has been found that a small, preferred group of aromatic compounds react most readily with the N-halosulfonyl compound to produce materials which are particularly useful in the applications heretofore mentioned. Such preferred aromatic compounds are benzene, naphthalene, diphenyl, and the halogenated and lower alkylated derivatives of each.

Useful N-halosulfonylamides contemplated by this invention are those of the formula,

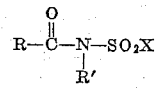

where X is a halogen atom, preferably chlorine, and R and R' are each hydrogen or an aliphatic or aromatic group. An aliphatic group can be an alkyl group having either a straight or branched chain, e.g., methyl, ethyl, isopropyl, t-butyl, n-hexyl, 2-ethylhexyl, decyl or dodecyl; a cycloalkyl group such as cyclohexyl; or an aralkyl group such as benzyl or phenylethyl. An aromatic group can be an aryl group such as phenyl, tolyl, etc.

The useful N-halosulfonylimides are generally those which are derived from dicarboxylic acids and have the formula,

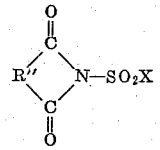

where X has the same meaning as above, and R" is an aliphatic or an aromatic group. The aliphatic acids from which such imides are derived include, for example, succinic, glutaric, adipic maleic, cyclohexane dicarboxylic, and the like. The aromatic acids include the isomeric phthalic acids, naphthalic acid, and the other isomeric naphthalene dicarboxylic acids. It will be recognized that the groups represented by R" can also contain substituents such as a halogen, a nitro group, an alkoxy or aryloxy group, or a hydrocarbon group.

Within the general formulae given above, the amides which are particularly preferred in the practice of this invention are those wherein X is chlorine, R is methyl, ethyl or phenyl, and R' is cyclohexyl, methyl or hydrogen. The particularly preferred imides are those wherein X is chlorine, and R" is lower alkylene, vinylene, phenylene and halogenated phenylene.

Good results are obtained when, relative to the quantity of the N-halosulfonylamide or N-halosulfonylimide, the quantity of the aromatic compound which functions as the acceptor of the amido or imido radical in the process is large; the excess can, for example, be 5 to 25 times the molar equivalent, for instance about 10 to 20 times. However, a smaller excess or equimolar proportions can be employed.

If desired, the reaction mixture can contain a solvent. This should be one which is inert to free radical attack, and preferably should be high boiling, such as, for instance, hexachlorobenzene.

Where a catalyst is used, the amount can vary over a wide range. There can be employed, for instance, as much as 0.5 gram mol (or gram atom) of a catalyst per gram mol of the N-halosulfonylamide or N-halosulfonylimide. Generally much smaller quantities than this are satisfactory however, and, in certain instances, as little as 0.0001 gram mol (or gram atom) of catalyst per gram mol of the N-halosulfonyl compound can be effective. The preferred number of gram mols (or gram atoms) of catalyst per gram mol of the N-halosulfonyl compound is generally within a range of about 0.001 to about 0.1, and excellent results are obtained when this number is about 0.01.

The product of the process of the invention is often a mixture of isomers. For certain uses it is not necessary that the isomers should be separated from each other, but this is normally practicable, for example by fractional crystallization or by chromatography, should such a separation be required.

*Example 1*

This example describes the production of a mixture of isomeric phthalimidodiphenyls by the action of N-chlorosulfonylphthalimide on diphenyl.

A mixture of 16.3 grams of N-chlorosulfonylphthalimide and 154 grams of diphenyl containing 0.1 gram of cuprous chloride was boiled under reflux at a temperature of about 255° C. for one hour; sulfur dioxide and hydrogen chloride were evolved. The excess diphenyl was then removed by steam distillation, giving 15.4 grams of a residue consisting of a mixture of phthalimidodiphenyl isomers. 4-phthalimidodiphenyl having a melting point of 293–295° C. was isolated by fractional crystallization of the mixture from benzene.

*Example 2*

Following the procedure of Example 1, 14.4 grams of N-chlorosulfonylbenzamide and 66.8 grams of toluene are employed as the starting reactants. The product obtained is identified as N-tolylbenzamide.

*Example 3*

Again following the procedure of Example 1, 11.3 grams of N-chlorosulfonyl methylacetamide and 178.8 grams of p-chlorodiphenyl are employed as the starting reactants. The product obtained is identified as 4-methylacetamido-4'-chlorodiphenyl.

*Example 4*

This example describes the production of N(2,5-dichlorophenyl)phthalimide by the action of N-chlorosulfonylphthalimide on 1,4-dichlorobenzene.

A mixture of 16.3 grams of N-chlorosulfonylphthalimide and 100 grams of 1,4-dichlorobenzene containing 0.21 gram of copper naphthenate was boiled under reflux at a temperature of about 255° C. for 25 hours; sulfur dioxide and hydrogen chloride were evolved. Excess 1,4-dichlorobenzene was distilled under reduced pressure from the reaction mixture, leaving a residue from which 2.9 grams of N(2,5-dichlorophenyl)phthalimide having a melting point of 209° C. were obtained by crystallization from 2-ethoxyethanol.

*Example 5*

This example describes the production of N(2,4,6-trichlorophenyl)phthalimide by the action of N-chlorosulfonylphthalimide on 1,3,5-trichlorobenzene.

A mixture of 10 grams of N-chlorosulfonylphthalimide and 74 grams of 1,3,5-trichlorobenzene containing 0.13 gram of copper naphthenate was boiled under reflux at a temperature of about 255° C. for six hours; sulfur dioxide and hydrogen chloride were evolved. Excess 1,3,5-trichlorobenzene was distilled under reduced pressure from the reaction mixture, leaving a residue from which 2.5 grams of N(2,4,6-trichlorophenyl)phthalimide having a melting point of 179–180° C. were obtained by crystallization from ethanol.

*Example 6*

Following the procedure of Example 5, 8.1 grams of N-chlorosulfonylsuccinimide and 43.5 grams of ethylbenzene are employed as the starting reactants. The product obtained is identified as N-ethylphenylsuccinimide.

*Example 7*

Again following the procedure of Example 5, 10.4 grams of N-cyclohexyl N-chlorosulfonylpropionamide and 64.4 grams of bromobenzene are employed as the starting reactants. The product obtained is identified as N-bromobenzenepropionamide.

*Example 8*

This example describes the production of N(2,3,5,6-tetrachlorophenyl)phthalimide by the action of N-chlorosulfonylphthalimide on 1,2,4,5-tetrachlorobenzene.

A mixture of 16.3 grams of N-chlorosulfonylphthalimide and 144 grams of 1,2,4,5-tetrachlorobenzene containing 0.07 gram of cuprous chloride was boiled under reflux at a temperature of about 255° C. for six hours; sulfur dioxide and hydrogen chloride were evolved. Excess 1,2,4,5-tetrachlorobenzene was distilled under reduced pressure from the reaction mixture, leaving a residue from which four grams of N(2,3,5,6-tetrachlorophenyl)phthalimide having a melting point of 285–286° C. were obtained by crystallization from 2-ethoxyethanol.

While the invention has been described herein with regard to several specific embodiments, it is not so limited. It is to be understood that modifications and variations of the invention, obvious to those skilled in the art, may be made without departing from the spirit and scope of said invention.

The embodiments of the invention in which an exclusive property or privilege is claimed are defined as follows:

1. A process for the production of a nitrogen-containing compound of the formula, Y=N—Z, wherein:

Z is selected from the group consisting of phenyl, naphthyl and diphenylyl, and the halogenated and lower alkylated derivatives thereof;

Y=N is selected from the group consisting of

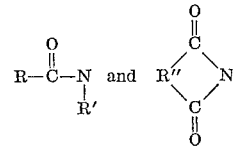

R is selected from the group consisting of methyl, ethyl and phenyl;

R' is selected from the group consisting of hydrogen, methyl and cyclohexyl; and R" is selected from the group consisting of lower alkylene, vinylene, phenylene and halogenated phenylene, said process comprising heating a compound of the formula, ZH, with a compound of the formula, $$Y=N-SO_2X$$

where X is halogen, and Y=N and Z have the same meaning as above.

2. A process as defined in claim 1 wherein the heating is at a temperature of from about 125° C. to about 300° C.

3. A process as defined in claim 1 wherein from one to about 25 mols of the compound, ZH, is employed for each mol of the compound, Y=N—SO₂X, where X, Y=N and Z have the same meaning as above.

4. A process for the production of a compound of the formula,

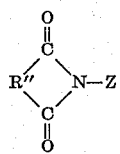

where R″ is phenylene and Z is chlorinated phenyl which comprises heating chlorinated benzene with a compound of the formula,

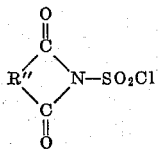

where R″ has the same meaning as above.

5. A process for the production of a compound of the formula,

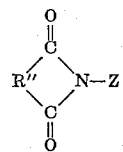

where R″ is phenylene and Z is diphenyl which comprises heating diphenyl with a compound of the formula,

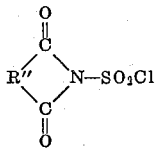

where R″ has the same meaning as above.

References Cited by the Examiner

Battegay et al.: Chem. Abs., volume 28, col. 2343 (1934).

Kharasch et al.: J. Org. Chem., volume 17, pages 453–6 (1952).

Meybeck et al.: Chem. Abs., volume 26, col. 3782 (1932).

NICHOLAS S. RIZZO, *Primary Examiner.*